United States Patent

Brodnitz et al.

[15] 3,686,324
[45] Aug. 22, 1972

[54] PROCESS FOR PRODUCING DI- AND TRISULFIDES FROM THIOSULFINATES

[72] Inventors: Michael H. Brodnitz, Matawan; John V. Pascale, Old Bridge, both of N.J.

[73] Assignee: International Flavors & Fragrances, Inc., New York, N.Y.

[22] Filed: Aug. 18, 1969

[21] Appl. No.: 851,067

[52] U.S. Cl. ............... 260/608, 99/140 R, 260/453 R
[51] Int. Cl. ........................................... C07c 149/12
[58] Field of Search .............................. 260/608, 453

[56] References Cited

FOREIGN PATENTS OR APPLICATIONS 654,390   1947   Great Britain ............. 260/453

OTHER PUBLICATIONS

Wahlroos et al., " Acta Chemica Scand." Vol. 19 (1965) pp. 1,327– 1,332.

Mannich et al., " Chem. Abstracts" Vol. 31 (1937) pp. 1,951– 1952.

Smith et al., " Chem. Abstracts" Vol. 40 (1946) pp. 6,752– 6,753.

*Primary Examiner*—Joseph Rebold
*Assistant Examiner*—D. R. Phillips
*Attorney*—Brooks, Haidt & Haffner

[57] ABSTRACT

Novel processes for the production of alliaceous flavoring compositions comprising heating at least one thiosulfinate having the formula

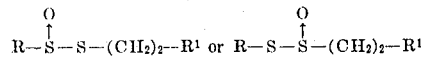

to produce a mixture of di- and trisulfides containing $R-S-S-CH=CH-R^1$ and $R-S-S-S-CH=CH-R^1$, R being an alkyl or alkenyl group having one to five carbon atoms and $R^1$ being hydrogen or an alkyl group having one to three carbon atoms, together with processes for preparing food compositions, and food and flavoring compositions so prepared.

5 Claims, No Drawings

PROCESS FOR PRODUCING DI- AND TRISULFIDES FROM THIOSULFINATES

BACKGROUND OF THE INVENTION

Increasing attention is being devoted to the preparation and utilization of artificial flavoring agents in foodstuffs. In many instances, artificial flavoring agents are much preferred over natural flavoring agents because flavors and foodstuffs can be tailored specifically to a given use and because flavors can be duplicated at will. This latter factor confers a major advantage to artificial food flavoring agents, since natural food flavoring agents such as extracts, essences, concentrates, and the like are often subject to wide variation because of changes in the quality, type and treatment of the raw materials obtained from crops or other sources subject to the vicissitudes of nature.

Such variation can be, and all too often is, reflected in the end product, and this results in inconsistent flavor characteristics, uncertainty as to cost and consumer acceptance, and the like. Additionally, when natural products are incorporated into the final foodstuff, there may be a rapid deterioration in the quality of the foodstuff because of the tendency of many natural products to spoil. This is a particularly vexatious difficulty in snack food products where dips, soups, chips, prepared dinners, canned goods, sauces, gravies, and the like pass through a complex distribution system and are thereafter apt to be stored by the consumer for some time prior to use.

It is well-recognized that the fundamental problem in the preparation of artificial flavoring agents is the achievement of true flavor reproduction. The problem is complicated in many cases by the lack of specific knowledge as to how flavors are developed in many foods.

Vegetable foodstuffs such as onions and the like are frequently relied upon to contribute significantly to the flavor and aroma impression of foodstuffs. Products such as dehydrated onions have been available for some time to serve as agents to modify and enhance the flavor of meat, vegetable, dairy, and like products. Such dehydrated products have suffered from the disadvantage that when they are reconstituted they do not fully recapture or duplicate the flavor which would be imparted by the use of fresh onions. Moreover, as noted above, there can be considerable variability due to the type of onion which is dehydrated and to the particular processing conditions used.

Onion and other oils are also available for use in flavoring foodstuffs, but these oils are also incapable of duplicating the flavor and aroma which would have obtained through the use of the fresh vegetables It is accordingly very desirable to provide flavoring materials which will impart either the missing nuance to a weakened or altered onion or other alliaceous flavor, or alternatively, to provide a good alliaceous flavor in its entirety.

THE INVENTION

The process of the present invention provides mixtures containing vinylene disulfides and trisulfides particularly useful for providing alliaceous organoleptic properties to foodstuffs. Briefly, the process comprises heating at least one organic thiosulfinate having the formula

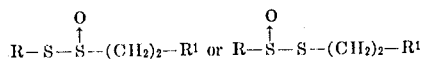

to produce a mixture of di- and trisulfides containing R — S — S — CH = CH — R$^1$ and R — S — S — S — CH = CH — R$^1$, wherein R is an alkyl or alkenyl group and R$^1$ is hydrogen or an alkyl group. The present invention also contemplates the use of the products as flavoring agents and as components of flavoring compositions and food compositions, as well as such compositions. Hereinafter, the products are also referred to as vinylene sulfides, and this term will be taken to include both di- and trisulfides.

It has been found the compounds prepared according to the reactions of this invention are suited to the preparation of a wide variety of alliaceous flavors, including onion, leek, chive, shallot, scallion, and the like. Since many of the vinylene sulfide mixtures possess flavor and aroma notes and nuances characteristic of freshly cooked onions, chives, shallots, and scallions, the reaction products are particularly suited to the emulation of freshly cooked onion flavors, and the provision of such flavors to products such as dried onions which, while having a definite, recognizable onion flavor, lack the zest of the freshly cooked products.

It will be understood from the present description that the reactions according to this invention can be carried out in situ in the actual food compositions or flavoring compositions themselves. The thiosulfinates have a flavor and aroma with a raw onion character, but as such thiosulfinates are heated to provide the vinylene sulfides, the freshly cooked organoleptic character is obtained. Thus, in certain preferred embodiments of the invention, the thiosulfinates are prepared and added to a foodstuff, for instance, ground meat for the preparation of hamburger patties. Then, upon subsequent cooking, baking, roasting, frying or other heating to prepare the foodstuff for consumption, some of the thiosulfinate or thiosulfinates are converted to the vinylene sulfide mixtures and contribute a fresh alliaceous flavor to the foodstuff itself.

The alkyl and alkenyl groups represented by R herein are desirably lower alkyl and alkenyl groups, preferably those having from one to about five carbon atoms in the molecule. Thus, these aliphatic groups include methyl, ethyl, propyl, isopropyl, vinyl, propenyl, including allyl, isopropenyl, butyl, methallyl, isobutylene, propylene, isoamyl, and the like. Unless otherwise indicated hereinafter "propenyl" will be used to designate prop-1-en-1-yl and "allyl" will be used to designate prop-2-en-1-yl. The particularly preferred aliphatic groups are methyl, propyl, allyl, and propenyl.

According to the present invention, R$^1$ is hydrogen or alkyl, and lower alkyl groups are desirable. In certain preferred embodiments of the invention the lower alkyl groups represented by R$^1$ contain from one to three carbon atoms, and methyl is especially preferred.

Excellent results are obtained using methyl-propyl thiosulfinates and dipropyl thiosulfinates which, when heated give rise to the formation of methyl propenyl disulfides, propyl propenyl disulfides, methyl propenyl trisulfides and propyl propenyl trisulfides. These sulfides, along with unreacted thiosulfinates, are advantageous when producing alliaceous flavors especially for the preparation of onion flavor. It will be understood by those skilled in the art that the processes of this invention are especially adapted for the preparation of alliaceous flavors requiring amounts of unsaturated disulfide. Thus, in addition to the preparation of onion flavors, the processes are also useful in the preparation of related flavors such as leek, scallion and shallot.

All of the compositions prepared according to the present processes preferably contain substantial quantities of disulfides and trisulfides, with the disulfides usually predominant. In many instances it is desirable to have the disulfides constitute from 50 to 80 percent of the total mixture and the trisulfides 20 to 50 percent. All parts, proportions, percentages, and ratios herein are by weight, unless otherwise indicated.

It will be appreciated that a single thiosulfinate can be used to provide alkenyl di- and trisulfides having the same number of carbon atoms on each side of the sulfide sulfur atoms, e.g., propylpropenyl sulfides, or to provide a single asymmetric sulfide mixture, e.g., methylpropenylsulfides. It will be appreciated that a divinylene di- and/or trisulfide can be prepared, e.g., dipropenyl from propenylpropyl thiosulfinate. Such sulfide mixtures produced from a single thiosulfinate can be used to enhance a particular flavor note in an alliaceous vegetable or to provide a flavor composition having the pronounced note of that particular sulfide mixture. Further, a mixture of various thiosulfinates can be utilized to provide a more complete, or even a complete, flavoring composition for addition to a food.

In preparing mixtures of di- and trisulfides to obtain certain desired flavors, it is desirable to control the quantity of the various alkyl and/or alkylene constituents of the thiosulfinate. Thus, for the production of onion and related flavors, certain preferred compositions contain from about 3 to about 15 percent methyl groups, with the remainder of the groups having two or more carbon atoms. For full onion flavor it is desirable that the remaining groups contain at least three carbon atoms, and compounds wherein the three carbon atom groups constitute from 50 to 97 percent of the total alkyl are desirable. The difference between the amount of methyl and the amount of three carbon-atom groups can be made up wholly or partly of two carbon atom groups, with any remainder being groups containing four or more carbon atoms.

In certain preferred embodiments of the invention for producing onion flavors, the final sulfide mixture contains from 50 to 75 percent disulfides and 25 to 50 percent trisulfides, from 5 to 15 percent methyl, from 40 to 60 percent propenyl (including allyl) and from 5 to 20 percent dipropenyl (including allylpropenyl).

The vinylene sulfides are produced by heating the thiosulfinates to temperatures of at least about 100° C. At lower temperatures, the reaction will proceed to some extent, but it becomes slower. In some embodiments it can be advantageous to have substantial unreacted thiosulfinate present, e.g., when it is desired to obtain a significant fresh onion flavor note, together with the freshly cooked onion flavor note. In any event, the process in many embodiments is carried out so that some unreacted thiosulfinates remain.

In the practice of this invention, it is usually not desirable to exceed a temperature of 400° C, as the reaction becomes difficult to control and undesirable pyrolysis can also take place with certain thiosulfinates. The reaction usually proceeds better at temperatures of 300° C or less. Accordingly, it is desirable that the reaction be carried out at from 100° to 300° C. Desirable ratios of disulfides and trisulfides can be obtained at temperatures of from 150° to 250° C, and the preferred temperature range is accordingly from 150° to 250° C.

It will be understood from the present disclosure that the thiosulfinates can be heated to provide the sulfides, and the reaction mixture is then added to the food. Alternatively, the thiosulfinate can be heated slightly to form only a small quantity of the sulfides and then added to the food or the thiosulfinate can be added directly to the food and then the food containing the thiosulfinate is heated to provide the vinylene sulfide in situ.

It will be appreciated by those skilled in the art that the time of the reaction will vary inversely with the temperature. Thus, at temperatures of 300° C, ten seconds or less will be sufficient to convert a large percentage of the thiosulfinate to vinylene sulfides. On the other hand, at 100° C the reaction can be carried out for 90 minutes or longer to provide higher yields of vinylene sulfides. As an example, at 100° C about 42 percent of the thiosulfinate is converted to the vinylene sulfide after 20 minutes. By contrast, at 200° C about 80 percent of the thiosulfinates are converted to the vinylene sulfides in 12–15 seconds. It will accordingly be appreciated from this description that the time of reaction can be varied from 10 seconds to 90 minutes with good results.

The heating of the thiosulfinates can be carried out using the pure substance or substances, but it is preferred that the reaction be carried out in an inert reaction vehicle. Suitable vehicles are those having atmospheric pressure boiling points below the upper temperature limit given above so that the reaction is moderated.

Suitable vehicles include water, aqueous liquids, lower alkanols such as methanol, ethanol, propanol, isopropanol, and the like, glycols and other polyhydroxy compounds such as ethylene glycol, propylene glycol, glycerol, sorbitol, and the like. Edible nontoxic vehicles are greatly preferred since the vinylene sulfide mixtures can be used as formed in situ without the necessity for further extraction or purification. The preferred reaction vehicles are water and aqueous media.

It will be understood from the present description that the aqueous or other media can be those occurring in natural food products such as meats, cheeses, soups, vegetables, and the like. Thus, for example, the vinylene sulfide mixtures can be produced by adding the thiosulfinate or thiosulfinates to hamburger patties, freezing the patties, and forming the sulfides when the thiosulfinates are heated during frying or other cooking of the patty. It can thus be seen that a fresh onion or other such alliaceous flavor and aroma quality can be directly produced during preparation of a foodstuff for consumption, and such embodiments are accordingly comprehended herein.

If concentrated or pure vinylene sulfides according to this invention are desired, the reaction vehicle, if used, can be removed by extraction with a suitable solvent for the vinylene sulfides. In this manner certain sulfides can also be preferentially extracted to shade the flavor toward one or another alliaceous vegetables or to supply a flavor note deficiency in a natural product by controlling the ratio and distribution of vinylene sulfides, as set forth above. Suitable solvents for extracting the sulfide mixtures from aqueous media include aliphatic hydrocarbons such as isopentane, hexane, cyclohexane, dodecane, and the like.

The reaction of thiosulfinate to provide vinylene sulfide mixtures can be carried out under sub- or super-atmospheric pressures, but normal atmospheric pressure is desirable. Subatmospheric reaction processes will permit the use of reaction vehicles which are too high-boiling at normal atmospheric pressure to maintain the desired temperature at reflux. Superatmospheric pressures, such as in preparing a foodstuff in a pressure-cooker, will provide shorter reaction times, as noted above.

The thiosulfinates for use in this invention can be conveniently prepared by oxidation of the corresponding disulfides and mixtures thereof. The oxidizing agent and conditions should be such as to avoid substantial degradation of the starting materials. It has been found convenient to utilize aromatic and/or aliphatic peracids such as monoperphthalic, perbenzoic, pertoluic, monoperterephthalic, peracetic, and the like, or an oxidizing agent such as hydrogen peroxide. A stoichiometric amount to a slight molar excess up to 10 percent of the oxidizing agent is used.

The oxidation is preferably carried out in a reaction vehicle which is inert to the oxidizing agent and sulfides under the reaction conditions. Suitable vehicles for the reaction include oxygenated solvents such as diethyl ether, ethylene glycol, Diglyme (dimethyl ether of diethylene glycol), and the like, chlorinated hydrocarbons such as chloroform, carbon tetrachloride, ethylene chloride, and the like, and mixtures thereof. Mixtures of diethyl ether and chloroform have been found to especially useful for their ease of separation from the thiosulfinates.

Since the oxidizing conditions must be carefully controlled, it is desirable to carry out the oxidation at temperatures of from −50° to 10° C. It is especially preferred to carry out the reaction at −5° to 5°C. The peracid is preferably added to the vehicle-sulfide combination, and this addition is carried out slowly. It is also noted that the vehicle-sulfide combination can be slowly added to the peracid or to the peracid in a vehicle. When the peracid is used with a vehicle, those vehicles noted above for use with the sulfide starting material are preferred.

After oxidation of the sulfides to the thiosulfinates, the aromatic acids formed and any unreacted peracid are removed from the reaction mixture. This is conveniently carried out by filtration, centrifugation, distillation, extraction, and the like. The thiosulfinates are then washed, neutralized, purified and separated. When high resolution purification is required, fractional distillation, crystallization, preparative chromatographic and like techniques can be used.

The sulfide mixtures used for preparation of the thiosulfinates can be prepared by reacting Bunte salts (S-alkyl or - alkylene thiosulfates) with an alkali-metal sulfide. They can also be obtained by reacting appropriate halides with alkali-metal thiosulfates and then reacting the Bunte salts so formed with an alkali-metal sulfide in situ.

In accordance with a further aspect of the present invention the vinylene sulfide mixtures are utilized per se or in combination with other edible materials to impart the desired alliaceous organoleptic impression to foods or other edible materials. Thus, the mixtures herein described can comprise flavor compositions and flavor-enhancing compositions. It will be understood herein that a flavoring composition is one capable of imparting a definite, complete flavor to a tasteless or bland foodstuff, while a flavor-enhancing composition is one capable of reinforcing one or more flavor notes of a natural or other food material which is deficient in such flavor note.

A flavor-enhancing composition is one useful for improving the flavor of, say, a dehydrated onion product, the flavor of which had been diminished or altered undesirably by the dehydration and/or other processing. It will accordingly be understood that the disclosed thiosulfinates and/or vinylene sulfide mixtures can be admixed with other flavoring ingredients, carriers, vehicles, and the like to form compositions suitable for imparting a flavor to, enhancing the flavor in, or altering the flavor of, a food composition, and such food compositions and the methods for preparing them are also contemplated herein. The term flavoring composition will hereinafter be used to mean both flavoring and flavor-enhancing compositions.

When the vinylene sulfides of this invention are used in flavoring compositions to enhance existing flavors in, or to provide the entire flavor impression to, a foodstuff, the mixtures can be combined with organic acids including fatty, saturated, unsaturated, and amino acids, alcohols, including primary and secondary alcohols, esters, carbonyl compounds including aldehydes and ketones, lactones, cyclic organic materials including benzene derivatives, alicyclics, heterocyclics such as furans, pyridines, pyrazines, and the like, other sulfur-containing materials including thiols, monosulfides, and the like, proteins, lipids, carbohydrates, and so-called flavor potentiators such as monosodium glutamate, and the like. It will be appreciated that the types and amounts of materials selected from the foregoing groups will depend upon the precise organoleptic character desired in the finished product and, especially in the case of flavoring compositions used to enhance other flavors, will vary according to the foodstuffs to which the flavor and aroma are to be imparted. Inorganic materials such as sodium chloride, and freshness preservers such as butylated hydroxyanisole, butylated hydroxytoluene, and propyl gallate can be added for their adjuvant or preservative effects on the flavoring compositions or upon the final food composition itself.

As noted above, it can also be desirable to utilize carriers such as solid, liquid, or plastic glycerides, gum arabic, carrageenen, or vehicles such as ethyl alcohol, water, propylene glycol, and the like. When the carrier comprises an emulsion, the flavoring composition can also contain emulsifiers such as sorbitol derivatives, mono- and diglycerides of fatty acids, and the like. With these carriers or vehicles the desired physical form of the composition can be prepared.

It will be understood that the vinylene sulfides (or the thiosulfinates from which they are produced) of this invention can be used in spray-dried, liquid, encapsulated, emulsified, and other forms in which flavorings are added to foodstuffs. The mixtures can be so used alone or in combination with the other ingredients set forth herein. It will further be understood that the mixtures of this invention can be utilized to provide or supplement alliaceous flavors in sauces such as barbecue and spaghetti sauces, meat such as frozen hamburger patties, freeze-dried pork chops, meat loaf, and the like, soups, dried soup mixes, dehydrated soup mixes, and the like, gravies, salad dressings, spice mixes for preparation of, for example, vinegar-and-oil salad dressings, spreads such as butter or margarine spreads for garlic bread, flavors for cottage cheese and other dairy products for salad use, sour cream, cream cheese and similar materials for use in dips and the like.

The amount of the vinylene sulfide or sulfides of this invention should be effective to alter the flavor, as by imparting the desired alliaceous flavor and aroma qualities, to the ultimate foodstuffs in which they are used. It will be appreciated from the present description that this invention relates to all manner of alliaceous products, including onion, leek, chive, shallot, and scallion flavors, as set forth above.

Thus, a small but effective amount of the vinylene sulfide mixture sufficient to provide the alliaceous flavor note is used. The amount used will vary depending upon the ultimate food composition to be flavored; for example, more may be required in producing a full, rounded flavor from an unflavored material, and less can be used when the mixtures are used to enhance a natural product which is deficient in natural flavor or aroma.

Those skilled in the art will appreciate that the amount of the di- and trisulfide mixtures according to this invention can be varied over a range to provide the desired flavor and aroma. The use of too little of the mixture will not give the full benefit, while too much not only makes the flavor compositions and foodstuffs needlessly costly, but also can overwhelm and unbalance the flavor and aroma so that desirable results are not obtained. It is accordingly preferred that the ultimate food composition contain from about 0.001 percent of the vinylene sulfide mixture, based on total composition, and it is not generally desirable to use more than about 4 percent in the finished composition. Accordingly, the desirable range for use in the process of this invention is from about 0.001 to 4 percent of the novel sulfide mixture produced herein, and in many embodiments a range from 0.01 to 1 percent is preferred. When these mixtures are added to the foodstuff in the form of a total flavor composition, the amount should be sufficient to impart the requisite flavor and/or aroma note to the food composition so that the flavor and aroma will be balanced in the finished foodstuff. Accordingly, the flavoring compositions of this invention preferably contain from about 1 to 50 percent of the mixtures, based upon the total weight of the flavoring composition. Amounts of thiosulfinate can also be used to provide the above-indicated quantities of vinylene sulfide in the finished foodstuff.

The flavoring compositions of the present invention can be added to the foodstuffs by conventional means known in the art. The flavor material of this invention, together with any other liquid if desired, can be admixed with a carrier such as gum arabic, gum tragacanth, carrageenen, and the like, and spray-dried to obtain a particulate solid flavoring material. When a powdered flavor mix is being made, the dried solids and mixtures of this invention are mixed together in a dry blender to obtain uniformity.

When liquid materials are involved in the preparation of foodstuffs, the flavoring materials of this invention can be combined with either the liquid to be used in the finished composition, or alternatively, they can be added with a liquid carrier in which they are dissolved, emulsified, or otherwise dispersed.

The following examples are given to illustrate embodiments of the invention as it is generally preferred to practice it. It will be understood that these examples are illustrative, and the invention is not to be considered as restricted thereto except as indicated in the appended claims.

EXAMPLE I

Synthesis of Onion Oil Containing Propenyls

A thiosulfinate is prepared by dissolving 26 g (0.173 mol) of bis(propyl) disulfide in 150 ml of diethyl ether and 50 ml of chloroform in a one-liter flask equipped with a dropping funnel, mechanical stirrer and thermometer. The flask is cooled to 0° C, and 340 ml (31.9 g; 0.175 mol) of monoperphthalic acid in ether is added dropwise with stirring during 2.5 hours, while the temperature is maintained at 0° C. The reaction mixture is retained at 0° C for 2 additional hours after all the acid has been added.

The resultant liquid is filtered from the phthalic acid which precipitates, and the ether solution is then diluted with 200 ml of fresh ether and washed with 300 ml of 10 percent aqueous sodium bicarbonate solution and then with 150 ml of distilled water. The washed solution is then dried over sodium sulfate at 0° C.

One portion of the mixture is treated on a rotary evaporator to remove the solvents. Gas-liquid chromatographic analysis shows that the product formed is n-propyl-1-propane thiosulfinate.

A 0.5 g portion of the thiosulfinate is added to 750 ml of distilled water in a one-liter flask. The flask is fitted with a reflux condenser and heated by a mantle. This mixture is refluxed for 2.5 hours, whereupon the flask contents are permitted to cool slightly, and a Dean-Starke trap is placed between the flask and the condenser. Ebullition continues and 100 ml is collected in the trap. This 100 ml sample is cooled to room temperature and extracted thrice with isopentane. The isopentane solution is then dried with anhydrous sodium sulfate and the isopentane removed with a stream of nitrogen to obtain a mixture having a 3:1 ratio of disulfides to trisulfides in the propenylpropyl sulfides so produced.

EXAMPLE II

A solution of 0.1795 g propylene glycol and 0.1923 g of a 90:10 mixture of dipropyl thiosulfinate:dodecane is prepared. The solution is divided into two aliquots and each aliquot is placed into a sealed vessel having a free volume four times the volume of the solution. One aliquot is heated at 225° C for 10 seconds and the other for 1 minute.

After heating, the vessels containing the two samples are rapidly cooled to room temperature and opened. Two phases are found: an upper phase containing the sulfide and dodecane and a lower phase containing water and propylene glycol. The dodecane is separated from the sulfide chromatographically. The ratio of propyl to propenyl in the sulfides so produced is 1.15 in the sample heated for 10 seconds and 2.00 in the sample heated for 1 minute.

EXAMPLE III

Preparation of Onion Flavor Material

A mixture of 0.1 g of methyl 1-propanethiosulfinate, 0.6 g of propyl 1-propanethiosulfinate, and 0.3 g of allyl 1-propanethiosulfinate is heated in a sealed vessel at 150° C for 30 seconds. The thiosulfinates are partially converted to sulfides to yield 0.475 g of the sulfides. The proportion of sulfides in the 0.475 g is found to be approximately:

| | |
|---|---|
| Methylpropenyl disulfide | 10 |
| Methylpropenyl trisulfide | 10 |
| Propylpropenyl disulfide | 30 |
| Propylpropenyl trisulfide | 30 |
| Allylpropenyl disulfide | 10 |
| Allylpropenyl trisulfide | 10 |

The sulfide mixture has a very strong freshly cooked onion aroma character after separation from the unreacted thiosulfinate. Before separation there is also a noticeable fresh onion odor character.

EXAMPLE IV

The sulfide composition of Example I is dissolved in propylene glycol in amount sufficient to give a 0.1 percent glycol solution of such product. This solution (0.9 cc) is added to 7.3 g of a soup base consisting of:

| Ingredient | Quantity (Parts) |
|---|---|
| Fine ground sodium chloride | 35.62 |
| Hydrolyzed vegetable protein (Nestle 4 BE) | 27.40 |
| Monosodium glutamate | 17.81 |
| Sucrose | 10.96 |
| Beef fat | 5.48 |
| Sethness caramel color (powder B & C) | 2.73 |

The resulting mixture is added to 12 ounces of boiling water to create a soup having an excellent fresh onion flavor.

The unseparated composition produced according to the procedure of Example III, containing sulfides and unreacted thiosulfinates, is added to the above soup base, and the mixture is then added to boiling water to provide a soup having a good rounded, fresh-cooked onion flavor. Similar results are obtained when materials from Examples I and III are used in combination with each other.

EXAMPLE V

One-half gram of the sulfide mixture of Example III is emulsified in a solution containing the following materials:

| Ingredient | Amount (g) |
|---|---|
| Gum arabic | 100 |
| Water | 300 |
| Butylated hydroxyanisol (20% solution in ethanol) | 0.5 |

The resulting emulsion is spray-dried in a Bowen Lab Model spray-drier with inlet temperature of 500° F, and outlet temperature of 200° F. Twelve grams of this spray-dried material is mixed with 29.2 grams of the soup base set forth in Example IV. The resulting mixture is then added to 12 ounces of boiling water, and an excellent onion-flavored soup is obtained.

EXAMPLE VI

A "gelatin solution" is prepared by dissolving 330 g of gelatin at 40° C in 8,250 g of de-ionized water, and 330 g of spray-dried gum arabic is dissolved at room temperature in 8,250 g of de-ionized water to form a "gum arabic solution." The gum arabic solution is placed in a 30-liter vessel and 2.5 liters of the gelatin solution is added. The temperature of the mixture is adjusted to 37° to 40° C. Through a tube beneath the surface of the gum arabic solution, 4,000 g of a 0.1 percent solution of a sulfide mixture as obtained in Example III in propylene glycol is added over a period of approximately 30 minutes.

The mixture is agitated at 37° to 40° C until an average droplet size of 25 microns is obtained. The remaining gelatin solution (6 liters) is added, and the pH of the solution is adjusted to 4.5 to 4.6, with a 10 percent aqueous sodium hydroxide solution.

After the 25 micron droplet size is achieved, the temperature is allowed to drop to 25° C over a period of approximately 2.5 hours while maintaining the pH at 4.5 to 4.6. The capsule slurry is then stirred and cooled to 5° C and is maintained at 5° C, with stirring, for at least 2.5 hours. The slurry is then spray-dried.

The capsules thus formed are filtered and a quantity is mixed with a vegetable soup base in the ratio of 1:6. Twenty grams of the resulting capsule-soup mixture is then added to 30 ounces of boiling water to obtain a soup having an excellent flavor with fresh-cooked onion seasoning.

EXAMPLE VII

A mixture of thiosulfinates is prepared as in Example III. A solution is prepared by dissolving 1.0 g. of the thiosulfinates in 20 g of propylene glycol. Ten grams of the propylene glycol solution is thoroughly kneaded into 2 pounds (about 900 g) of ground round steak. The ground round is then formed into 12 hamburger patties.

Six of the patties are then fried in a skillet and the odor of cooking fresh onions is quite perceptible. When the patties are cooked through, they are tasted and found to have a good onion flavor character. The onion flavor character is imparted by the sulfides in combination with unreacted thiosulfinates.

The other six patties are quickly frozen at 0° F (−18° C) and held for 1 month. They are then thawed at room temperature and cooked in the same manner as the other six patties. Once again, there is a perceptible odor of cooking fresh onions and the patties themselves have a good onion flavor after cooking.

What is claimed is:

1. A process for the preparation of alliaceous flavoring compositions comprising heating at a temperature of from about 100°–300°C. thiosulfinates having the formula

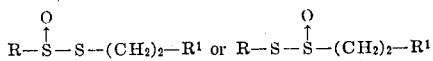

to produce a mixture of di- and trisulfides containing R — S — S — CH = CH — $R^1$ and R — S — S — S — CH = CH — $R^1$, wherein R is an alkyl or alkenyl group having one to five carbon atoms and $R^1$ is hydrogen or an alkyl group having one to three carbon atoms.

2. A process according to claim 1 wherein the thiosulfinates are heated to 150° to 250°C.

3. A process according to claim 1 wherein R is propyl, allyl, or propenyl and $R^1$ is methyl.

4. A process according to claim 1 wherein the mixture so produced contains from 3 to 15 percent methyl groups and the remainder of the alkyl or alkylene groups have two or more carbon atoms.

5. A process according to claim 1 wherein the mixture so produced contains from 50 to 75 percent disulfides and 25 to 50 percent trisulfides, and the alkyl and alkylene groups comprise from 5 to 15 percent methyl, from 40 to 60 percent propenyl, and from 5 to 20 percent dipropenyl.

* * * * *